United States Patent [19]

Sutton

[11] Patent Number: 4,845,410
[45] Date of Patent: Jul. 4, 1989

[54] LOW COST, HIGH SPEED, HIGH VOLTAGE FLYBACK REGULATOR CIRCUIT

[75] Inventor: Leroy A. Sutton, Wheeling, Ill.

[73] Assignee: Zenith Electronics Corporation, Glenview, Ill.

[21] Appl. No.: 213,553

[22] Filed: Jun. 30, 1988

[51] Int. Cl.$^4$ ............................................. H01J 29/70
[52] U.S. Cl. .................................. 315/411; 358/190; 358/243; 363/21
[58] Field of Search ................ 315/411; 358/190, 243; 363/21

[56] References Cited

U.S. PATENT DOCUMENTS 4,642,744  2/1987  Thomas ............................ 358/190
4,656,399  4/1987  Testin et al. ..................... 358/190
4,737,694  4/1988  Dietz ............................... 315/411

Primary Examiner—Theodore M. Blum

[57] ABSTRACT

A conventional flyback type deflection system develops a high DC voltage that is sensed by a small potentiometer connected in series with a bleeder resistor coupled across the flyback winding. A differential amplifier compares the sensed voltage with a reference voltage and drives a voltage controlled oscillator, which develops a pulse output whose frequency is a function of the sensed voltage. The VCO drives a FET that in turn controls current flow through a small flyback coil arrangement. The output of the coil arrangement is rectified and a DC compensating voltage is developed across a capacitor that is coupled in series with the high voltage flyback winding.

4 Claims, 2 Drawing Sheets

LOW COST, HIGH SPEED, HIGH VOLTAGE FLYBACK REGULATOR CIRCUIT

BACKGROUND OF THE INVENTION

This invention relates generally to high voltage regulating systems and particularly to a low cost, high speed, regulating system for use with a conventional flyback transformer.

Flyback deflection systems are well known and widely used in television receivers. In such systems, a deflection voltage source drives an autotransformer with a ramp shaped current for deflecting an electron beam across the phosphor coated faceplate of a cathode ray tube (CRT). At the end of the ramp waveform, a relatively large retrace pulse is developed. This pulse is magnified by the turns of the flyback transformer winding and rectified to develop the high DC voltage required to operate the CRT. As is well known, although the high voltage system is tuned, the high DC voltage produced varies substantially with system loading that occurs due to increases in the electron beam current of the CRT. There have been numerous circuits in the art for "stiffening" the high voltage supply. In many applications, a separate, non-deflection-based high voltage system is used because of its tighter tolerance on regulation.

With the growing use of computer monitors, the need for precision CRT displays has increased. In these uses, high voltage regulation is critical and needs to be closely controlled to prevent unacceptable raster distortion and size changes. On the other hand, the needs of the marketplace are such that the cost of the monitor must be maintained as low as possible. These conflicting requirements pose a dilemma which the present invention solves.

OBJECTS OF THE INVENTION

A principal object of the invention is to provide an improved flyback type high voltage regulating system.

Another object of the invention is to provide a low cost, high speed, regulating system for a flyback type high voltage system.

An additional object of the invention is to provide an improved high voltage regulating system and method.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
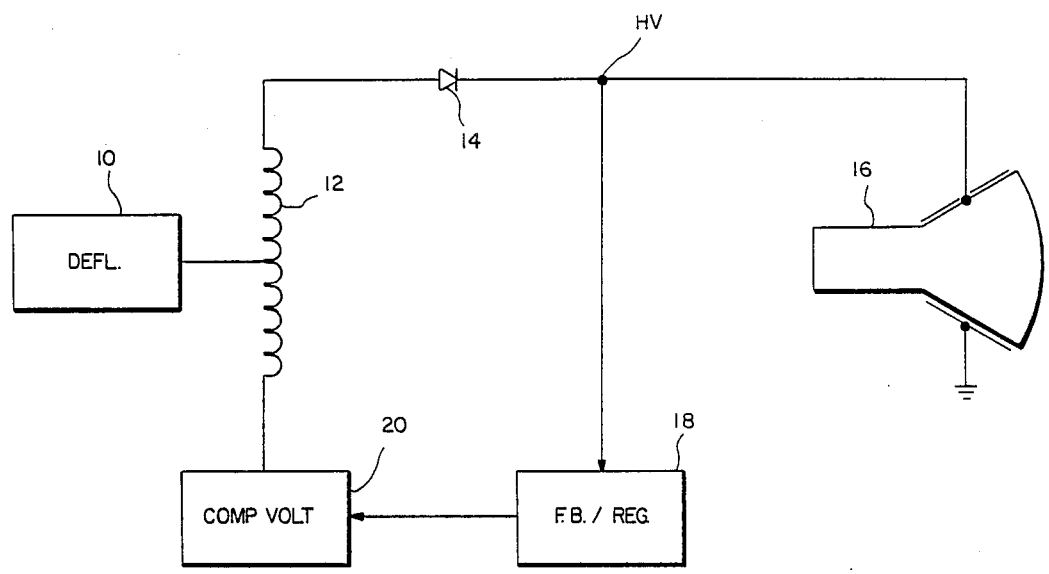
FIG. 1 is a simplified, partial block diagram of a deflection system constructed in accordance with the invention.

Referring to FIG. 1, a source of deflection voltage 10 is coupled to a high voltage flyback winding 12 having its upper end connected to a diode 14. The rectified high voltage output of the diode is supplied to the anode of a CRT 16, as is conventional. A block 18, labelled FB/REG (feedback/regulation), is coupled to diode 14 and in turn supplies a block 20 labelled COMP VOLT (compensating voltage) which is connected to the lower end of flyback winding 12. The cathode of diode 14 is connected to a terminal labelled HV (high voltage). Block 18 comprises sensing means for feeding back a voltage indicative of the high DC voltage developed by diode 14 and for producing a regulating potential that is converted into a compensating voltage that is applied in series with the flyback winding 12. Deflection block 10 will be understood to include a deflection transformer of which flyback winding 12 is a part.

Figure 2:
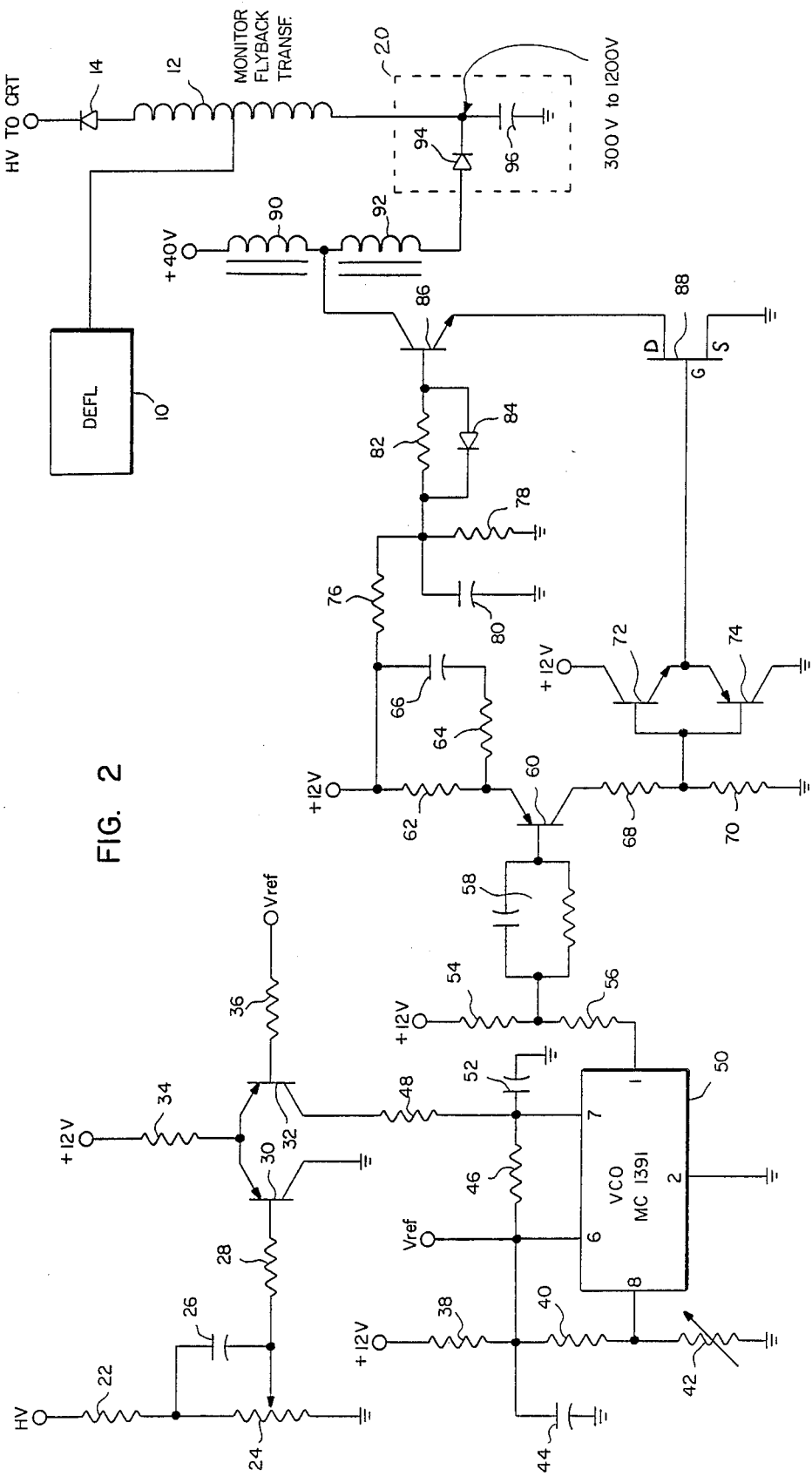
FIG. 2 is a detailed schematic diagram of the circuit of the invention.

In FIG. 2, a voltage divider comprising a bleeder resistor 22 and a small potentiometer 24 is coupled across terminal HV and ground. A slider on potentiometer 24 is connected to the junction of bleeder resistor 22 by a frequency compensating capacitor 26. The slider is also connected through a series resistor 28 to the base of a transistor 30 which has a grounded collector and an emitter that is connected to the emitter of a transistor 32. Transistors 30 and 32 form a differential pair with their emitters being connected to a source of +12 volts through a resistor 34. A small resistor 36 connects the base of transistor 32 to a voltage reference source Vref.

The collector of transistor 32 is connected through a resistor 48 to a pin 7 of a voltage controlled oscillator (VCO) that is identified as an MC1391. The oscillator timing circuit consists of a capacitor 52 connected from pin 7 to ground and a resistor 46 and the current in a resistor 48. The oscillator low frequency is set by resistor 46 and capacitor 52. The high frequency limit is raised by resistor 48 and transistor 32. The VCO 50 has appropriate pin numbers identified thereon with pin 1 comprising an output and pin 2 being connected to ground. The B+ voltage for the MC1391 is supplied by resistor 38 and bypassed with capacitor 44. This is also the reference voltage Vref for VCO 50. A resistor 40 and a variable resistor 42 connected to pin 8 of VCO 50 is used to set the duty cycle of the output signal at pin 1.

The output of pin 1 of VCO 50 is connected to +12 volts through a series connection of resistors 54 and 56. The junction of these resistors is connected through a wave shaping network 58 to the base of a transistor 60 having its emitter connected to +12V through a resistor 62 and its collector connected to ground through a series connection of resistors 68 and 70. The junction of resistors 68 and 70 is connected to the base electrodes of a pair of emitter follower transistors 72 and 74 connected between +12V and ground. These elements buffer the output signal from VCO 50 and maximize the switching speed of the signal applied to FET 88. The emitter of transistor 60 is connected through a resistor 64 and a capacitor 66 in parallel with a resistor 62 to +12V. Another voltage divider from +12V to ground consists of resistors 76 and 78, with their junction being connected to ground by means of a capacitor 80. This junction is also connected to a resistor 82 connected in parallel with a diode 84 to provide base drive for a transistor 86 having its emitter connected to the drain (D) of FET 88, the source (S) of which is connected to ground. The gate (G) of FET 88 is connected to the emitters of emitter follower transistors 72 and 74. The collector of transistor 86 is connected to the junction of a pair of coils 90 and 92 that are connected in autotransformer relationship between +40 volts and a diode 94 that, in turn, is connected to the junction of the lower terminus of flyback transformer winding 12 and a capcitor 96. The other end of capacitor 96 is connected to ground. The DC compensating voltage for changing the HV output voltage at terminal HV of the flyback is developed by diode 94 and capacitor 96 and is typically in the range of 300V to 1,200V.

In operation, the high voltage developed across terminal HV is sensed by potentiometer 24. The voltage at the slider of potentiometer 24 is applied to one input of the differential amplifier formed by differential pair transistors 30 and 32, the other input of which is connected to Vref. Changes in the high DC voltage at terminal HV are thereby communicated to the differential amplifier, and result in changes in current in the collector of transistor 32 which is connected to pin 7 of VCO 50. Changing the current supplied to pin 7 of VCO 50 changes the frequency of VCO 50. Under normal conditions, the VCO operates between 120 KHz and 320 KHz. The duty cycle of the oscillator does not change, just its frequency of operation. An increase in frequency results in a decrease in DC potential applied to the base of the flyback winding 12. As the voltage at the HV terminal decreases, the current in transistor 30 increases, the current in transistor 32 decreases and the frequency of VCO 50 decreases. The output square wave from pin 1 from VCO 50 decreases in frequency, resulting in current flow in winding 90 for a longer period. Winding 90 stores more energy and the voltage developed across capacitor 96 increases which raises the voltage developed at the high voltage terminal HV.

As mentioned, the range of DC voltage developed across capacitor 96 is from 300V to 1,200V based upon changes in VCO frequency from 300 KHz to 120 KHz. In the system of the preferred embodiment, the deflection frequency for the monitor CRT is 64 KHz. The high voltage is therefore sampled or updated at a faster rate than a single horizontal scan, which contributes to very tight control of the high voltage output. It will also be appreciated that the invention contemplates that a linear amplifier may be used to provide the necessary boost in voltage to be added to the bottom of the flyback winding.

The emitter follower transistors 72 and 74 are provided to develop the high gate current for assuring rapid switching of FET 88. The autotransformer 91 has about a one-quarter inch diameter core and windings 90 and 92 each have 50 turns. The incorporation of transistor 86 is due to present economics, since the cost of a larger current FET is presently greater than the cost of transistor 86 and its associated drive parts. Those skilled in the art will readily note that the D terminal of FET 88 may be connected directly to the junction of windings 90 and 92, resulting in the elimination of resistors 76, 78 and 82, capacitor 80, diode 84 and transistor 86, by using a suitably high voltage FET 88, i.e. approximately 700 volts.

It is thus apparent that numerous modifications and changes in the described embodiment of the invention may be readily made by those skilled in the art without departing from its true spirit and scope. The invention is to be limited only as defined in the claims.

What is claimed is:

1. A high voltage regulator circuit comprising:
   a flyback transformer including a primary winding and a high voltage winding, for developing a high frequency deflection voltage for a cathode ray tube;
   means coupled to said high voltage winding for developing a high DC voltage from said flyback transformer;
   sensing means, receiving said high voltage, for developing a control voltage indicative of said high DC voltage;
   compensating means coupled to said sensing means and to said high voltage winding for developing and applying a compensating voltage in series with said high voltage winding for compensating for changes in said high DC voltage; and
   said compensating means including a voltage controlled oscillator, having a frequency greater than the frequency of said deflection voltage, and having an input coupled to said sensing means; and rectifying means coupled to the output of said oscillator, said rectifying means being connected in circuit with said high voltage winding.

2. The regulator of claim 1 wherein said developing means includes a bleeder resistor, said sensing means comprising a sense resistor connected in series with said bleeder resistor.

3. In a flyback deflection system of the type including a flyback transformer having a high voltage winding and high voltage means for developing a high DC voltage by rectification of a flyback pulse produced by said high voltage winding, the improvement in regulating means for developing a DC compensating voltage for application in series with the high voltage winding, comprising:
   a voltage controlled oscillator having a frequency that is greater than the frequency of said flyback pulses;
   sensing means for monitoring said high DC voltage coupled to said voltage controlled oscillator; and
   rectifying means connected in series with said high voltage winding, and coupled to said voltage controlled oscillator.

4. The system of claim 3 wherein said sensing means comprises a pair of resistors supplied with said high DC voltage, a source of reference potential and a differential amplifier coupled between said pair of resistors and said source of reference potential for driving said voltage controlled oscillator.

* * * * *